United States Patent [19]
Seng et al.

[11] Patent Number: 5,870,693
[45] Date of Patent: Feb. 9, 1999

[54] APPARATUS AND METHOD FOR DIAGNOSIS OF ABNORMALITY IN PROCESSING EQUIPMENT

[75] Inventors: Chin Chye Seng; Akihide Madenokoji; Tetsuro Shibasaki, all of Singapore, Singapore

[73] Assignee: Sony Display Device (Singapore) Pte. Ltd., Singapore, Singapore

[21] Appl. No.: 757,921

[22] Filed: Nov. 27, 1996

[51] Int. Cl.$^6$ .................................................. G01R 31/28
[52] U.S. Cl. ............................................. 702/59; 702/122
[58] Field of Search .................................... 364/140, 150, 364/221.9, 468.16, 468.24, 478.01, 478.1, 921.4; 702/58, 59, 81, 90, 117, 122

[56] References Cited

U.S. PATENT DOCUMENTS

| | | | |
|---|---|---|---|
| 3,987,432 | 10/1976 | Yanauchi et al. | 340/525 |
| 4,183,462 | 1/1980 | Hideshima et al. | 395/185.03 |
| 4,633,384 | 12/1986 | Kusumi | 364/140 |
| 4,748,553 | 5/1988 | Itoh et al. | 364/140 |
| 4,851,985 | 7/1989 | Burror et al. . | |
| 4,947,349 | 8/1990 | Munenasa et al. | 364/551.01 |
| 5,097,470 | 3/1992 | Gihl . | |
| 5,148,363 | 9/1992 | Sakamoto et al. | 364/143 |

FOREIGN PATENT DOCUMENTS

0 618 549 A 10/1994 European Pat. Off. .

*Primary Examiner*—John Barlow
*Assistant Examiner*—Craig Steven Miller
*Attorney, Agent, or Firm*—Frommer Lawrence & Haug, LLP; William S. Frommer

[57] ABSTRACT

An apparatus and a method for diagnosing any abnormality in a processing equipment without the necessity of professional knowledge of a user while ensuring enhanced general-purpose usability. In the apparatus, a computer is connected to a programmable logic controller for controlling the operation of a processing equipment which repeats a predetermined sequence of a plurality of steps, while monitoring information from the processing equipment changed in accordance with the operation in the equipment, thereby automatically detecting any abnormal state in the equipment. The computer comprises memory means for previously storing changes of the information of at least one sequence from the processing equipment in its normal operation; and automatic analysis means for acquiring the information from the processing equipment during its halt caused upon occurrence of any abnormality in the equipment, then comparing the acquired information with the information stored previously in the memory means, and executing an analysis of the abnormal state on the basis of the result of such comparison.

12 Claims, 9 Drawing Sheets

| STEP NO. | CONTENTS OF STEPS | PROGRAM NO. |
|---|---|---|
| ① | TRANSFEP HEAD DOWN | 15001 |
| ② | CHUCK CLOSE | 15002 |
| ③ | TRANSFER HEAD UP | 15005 |
| ④ | TRANSFER FORWARD | 15006 |
| ⑤ | TRANSFER HEAD DOWN | 15008 |
| ⑥ | CHUCK OPEN | 15009 |
| ⑦ | TRANSFER HEAD UP | 15010 |
| ⑧ | TRANSFER REVERSE | 15011 |

FIG. 5

| I/O ADDRESS | CONTENTS |
|---|---|
| X 1 0 0 | TRANSFER HEAD UP |
| X 1 0 1 | TRANSFER HEAD DOWN |
| X 1 0 2 | CHUCK OPEN |
| X 1 0 3 | CHUCK CLOSE |
| X 1 0 4 | CHUCK MISS |
| X 1 0 5 | TRANSFER REVERSE |
| X 1 0 6 | TRANSFER FORWARD |
| X 1 0 7 | UNLOAD READY |
| X 1 0 8 | LOAD READY |

APPARATUS AND METHOD FOR DIAGNOSIS OF ABNORMALITY IN PROCESSING EQUIPMENT

BACKGROUND OF THE INVENTION

1. Field of the Invention

The present invention relates to an apparatus and a method for automatically diagnosing any abnormality such as fault or trouble in a processing equipment and outputting an adequate instruction which contributes to a proper corrective action of a user.

2. Description of the Related Art

It is observed of late that automation is in rapid progress with regard to processing equipments where production of desired articles is performed by successively executing a series of sequences which comprise, for example, execution of a predetermined process, carriage of the articles to a next processing section, and execution of a preset step therein, whereby the processing steps in serial production and so forth are executed substantially in a full automatic mode according to a program prepared in a controller for controlling the processing equipment.

The controller employed in such processing equipment is called PLC (Programmable Logic Controller), where a program for controlling a series of processing steps is incorporated. This program is prepared by a user in a ladder language which is different from any ordinary language used normally in computers.

Since this program incorporated in a PLC is intended to be used for controlling a sequence, the program can be so prepared that, when any abnormality such as fault has occurred in a processing equipment, an alarm is generated to indicate the fact of occurrence of such fault as a portion of the sequence, but it is difficult to include, in the program, an abnormality diagnosis which instructs the user to perform a required action against the faulty portion or the fault itself. Further, any fault capable of generating an alarm needs to be predictable in the processing equipment, and no alarm can be generated at all with regard to any nonpredicted abnormality.

Therefore the user himself needs to perform a fault diagnosis but, since the latest processing equipment is complicated, it is difficult even for a skilled person to achieve an exact fault diagnosis. For this reason, there is currently adopted a method which carries out fault diagnosis in a processing equipment by the use of a stand-alone computer.

In this case, a so-called expert system is frequently employed as software for fault diagnosis. This expert system relates to one of artificial intelligence application fields and, by previously incorporating knowledge and know-how of solution in a computer, assists services at a level equivalent to or higher than that attained by a skilled person or a human expert.

In the use of this expert system for fault diagnosis, knowledge required for such diagnosis is inputted previously in a computer. And in practical fault diagnosis, the computer successively asks the user some questions with regard to the fault. Then the user successively inputs into the computer the answers to the questions. Subsequently the computer diagnoses the fault from the information inputted by the user and on the basis of the knowledge and know-how (knowledge data base) stored in the computer itself, thereby finding a means of solution and outputting the resultant information to the user.

As mentioned above, the conventional abnormality diagnosis system known heretofore is based on the premise that the knowledge required for the diagnosis needs to be previously inputted into the computer, and the user should answer the questions outputted from the computer employing the expert system. Consequently, it is necessary for the user to be well acquainted with the construction of the processing equipment and the sequence, hence raising some problems that the relevant system is not exactly handleable by any ordinary person and the period of time from occurrence of a trouble to a halt of the processing equipment is rendered long.

In view of the above circumstances, the present applicant proposed, in Japanese Patent Application No. Hei 5-219122, an abnormality diagnosis system wherein a computer is connected to a PLC for controlling the operation of a processing equipment, then any abnormal state in the processing equipment is detected automatically by the computer, and the result relative to the detected abnormal state is displayed.

The computer in such proposed abnormality diagnosis system analyzes a program acquired from the PLC while acquiring input/output data relative to the operation sequence of the processing equipment, then detects any abnormality in the processing equipment from the acquired data and the result of the analysis in accordance with the knowledge data base of an expert system and so forth provided in advance, and supplies to the user the information indicative of the detected abnormal state.

However, the abnormality diagnosis system in the related art mentioned above is the one employing an expert system, and it is based on the premise that the expert system needs to be previously informed of the structure of the program in the PLC, whereby the general-purpose usability thereof is insufficient.

SUMMARY OF THE INVENTION

It is an object of the present invention to provide an apparatus and a method contrived for diagnosis of abnormality in a processing equipment without the necessity of employing any expert system and handleable with facility even by a nonprofessional user while being abundant in general-purpose usability.

According to one aspect of the present invention, there is provided an abnormality diagnosis apparatus wherein a computer is connected to a programmable logic controller for controlling the operation of a processing equipment which repeats a predetermined sequence of a plurality of steps, while monitoring information from the processing equipment changed in accordance with the operation in the processing equipment, thereby automatically detecting any abnormal state in the processing equipment.

The computer comprises memory means for previously storing changes of the information of at least one sequence from the processing equipment in its normal operation; and automatic analysis means for acquiring the information from the processing equipment during its halt caused upon occurrence of any abnormality in the equipment, then comparing the acquired information with the information stored previously in the memory means, and executing an analysis of the abnormal state on the basis of the result of such comparison.

According to another aspect of the present invention, there is provided an abnormality diagnosis method characterized by: connecting a computer to a programmable logic controller for controlling the operation of a processing equipment which repeats a predetermined sequence of a plurality of steps; previously storing, in memory means of the computer, changes of information of at least one sequence obtained from the processing equipment in its normal operation; and acquiring, by the computer, the information from the processing equipment during its halt caused upon occurrence of an abnormal state in the equipment, then comparing the acquired information with the information stored previously in the memory means, and analyzing the abnormal state on the basis of the result of such comparison.

The information acquired from the processing equipment includes at least an identifier of the information change time, and information of one or more channels relative to the operation of the processing equipment. The automatic analysis means detects, from the identifier, the information change time at the halt of the processing equipment, then compares the stored information of each channel at the detected change time with the information of each channel acquired from the controller, and selectively detects, on the basis of the result of such comparison, the relevant one channel concerned with occurrence of the abnormal state.

The processing equipment executes the sequence of plural steps under control of the programmable logic controller (PLC). In the present invention of the constitution mentioned above, the computer previously stores, in the memory means thereof, changes of the information of one sequence (one cycle) obtained from the processing equipment during its normal operation.

The automatic analysis means acquires, from the PLC for example, the information at the time of a halt of the processing equipment caused upon occurrence of an abnormal state, then compares the acquired information with the stored information in the normal operation, and diagnoses the abnormal state on the basis of the result of such comparison.

The information change time point at the halt of the processing equipment due to the abnormal state is discriminated by the identifier, and the same change time is found out from the plural change instants of one sequence stored in the memory means. In case the information from the processing equipment is composed of a plurality of channels relative to the operation of the processing equipment, the data of the individual channels are compared, and the relevant channel concerned with the cause of occurrence of the abnormal state is detected with reference to the data change time at the halt and the output data at the preceding data change time.

The above and other features and advantages of the present invention will become apparent from the following description which will be given with reference to the illustrative accompanying drawings.

DESCRIPTION OF THE PREFERRED EMBODIMENT

Hereinafter a preferred embodiment of the abnormality diagnosis apparatus of the present invention for a processing equipment will be described in detail with reference to the accompanying drawings.

Figure 2:
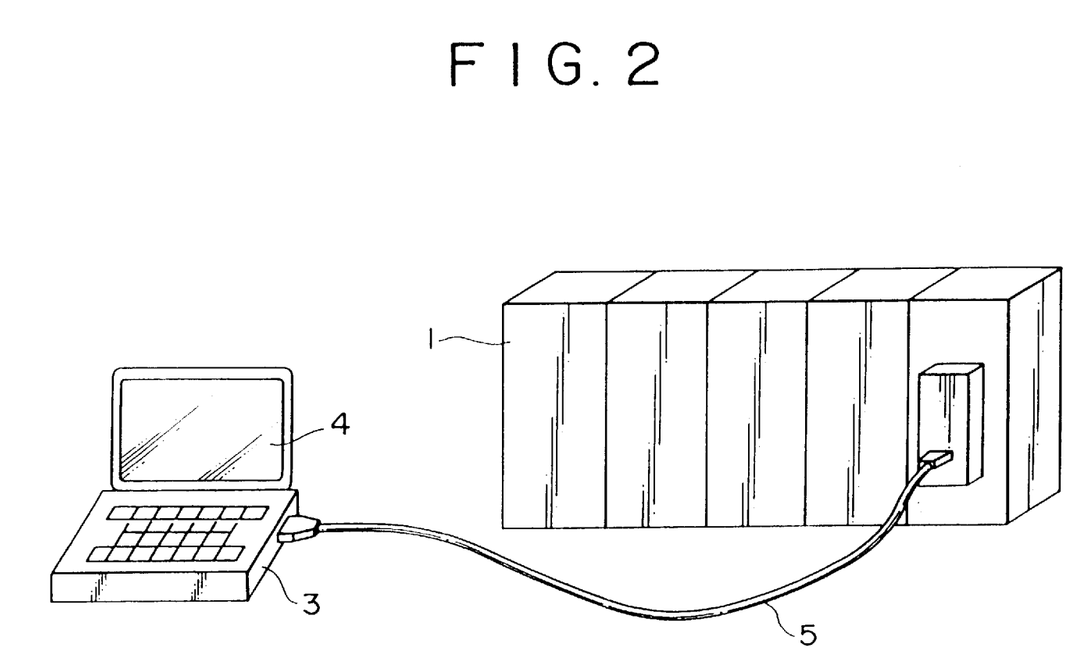
FIG. 2 is a perspective view of the embodiment representing the abnormality diagnosis apparatus of the present invention for a processing equipment.

FIG. 2 is a perspective view illustrating the whole system constitution of the abnormality diagnosis apparatus of the invention. A processing equipment 1 such as a production equipment executes a plurality of steps of each sequence successively under control of a PLC 2 (not shown in FIG. 2).

In this embodiment, a program in the PLC 2 is more complicated with an increase of the scale of the processing equipment 1, and therefore the processing equipment 1 is divided into a plurality of small modules 1A, 1B, . . . and so forth, and further the program in the PLC 2 is also divided correspondingly to the small modules in conformity with the mechanical construction of the processing equipment 1. The small modules operate independently of one another and achieve the intended operation of the entire equipment while monitoring the mutual states thereof at predetermined time points.

And upon occurrence of any abnormal state where the processing equipment 1 is brought to a halt due to a trouble or the like during the sequence, it is necessary to diagnose such an abnormal state automatically and to give an adequate instruction to a user for a proper operation. For this purpose, in the present invention, a computer 3 is connected to the PLC 2 via a communication interface 5 such as, e.g., RS-232C.

In this case, a display device 4 is connected to the computer 3 for giving information relative to the faulty portion and instructing the user to take a necessary action against the abnormality.

Figure 1:
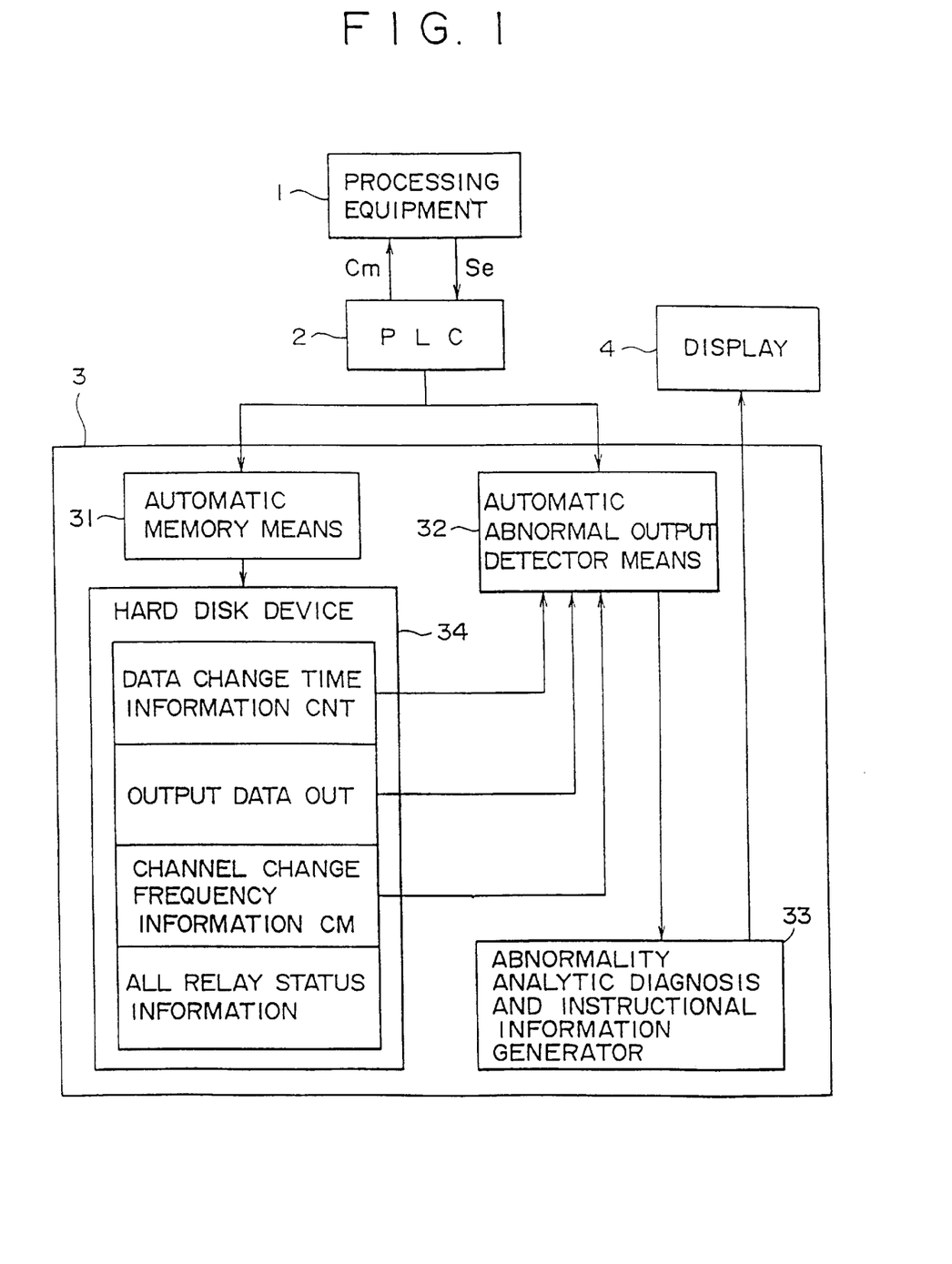
FIG. 1 is a block diagram of an embodiment representing an abnormality diagnosis apparatus of the present invention for a processing equipment.

FIG. 1 is a block diagram showing the entire constitution of the abnormality diagnosis apparatus in this embodiment where the blocks represent individual processing functions with the computer 3 at the center.

In controlling the operation sequence of the processing equipment 1, the PLC 2 gives an operation command Cm to the processing equipment 1. In this stage, the PLC 2 performs its control by first receiving various information Se as I/O (input/output) data from the processing equipment 1 inclusive of a sensor output and an on/off state of a relay switch (hereinafter referred to simply as a relay), then sending a next operation sequence control command to the processing equipment 1 while monitoring the information Se such as the relay state output, thereby executing the desired sequence.

The PLC 2 allocates the above-described relay state or the like to 1 bit to thereby produce output information of 1 channel. Accordingly, the channel information monitored by the PLC 2 and sent to the computer 3 as will be mentioned later includes a plurality of channels also in view of the fact that the processing equipment 1 is divided into a plurality of small modules.

Figure 3:
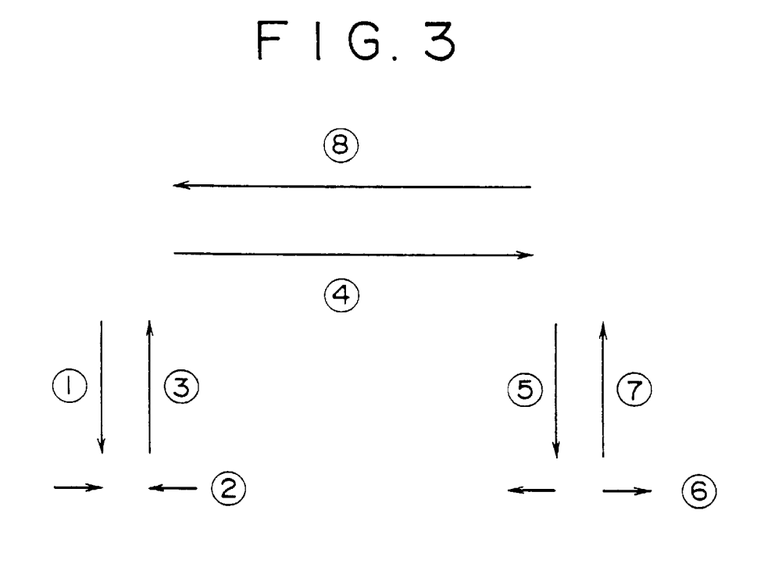
FIG. 3 illustrates an exemplary sequence executed in the processing equipment.
Figure 4:
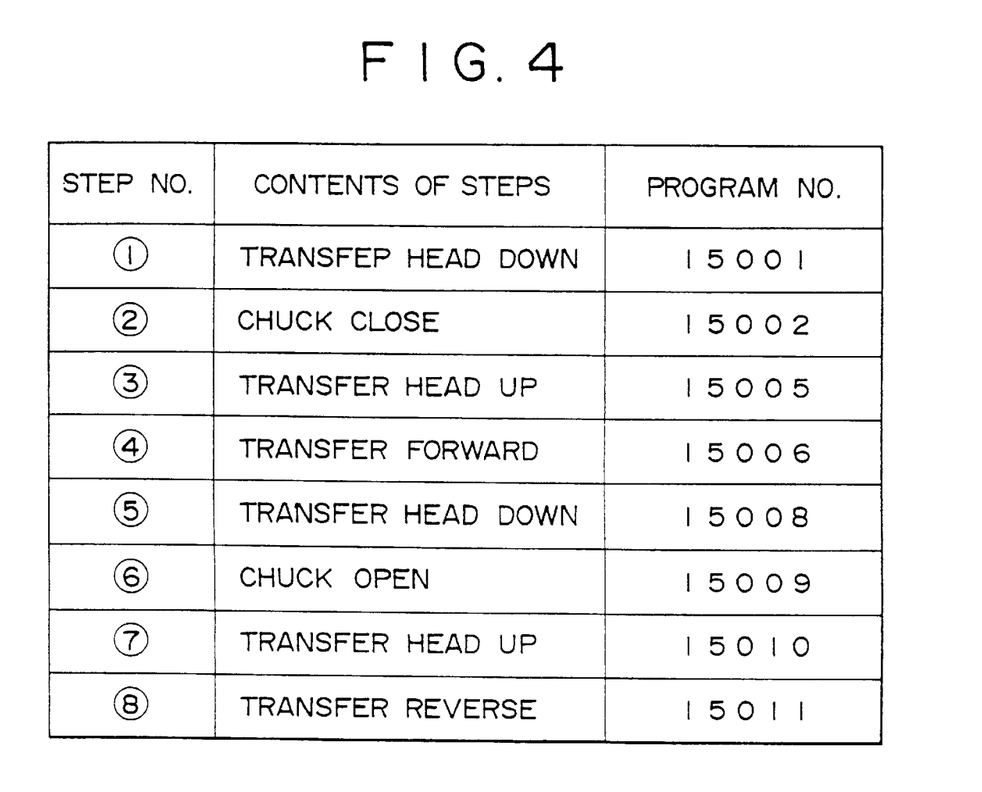
FIG. 4 is a table showing the exemplary sequence in the processing equipment.
Figure 5:
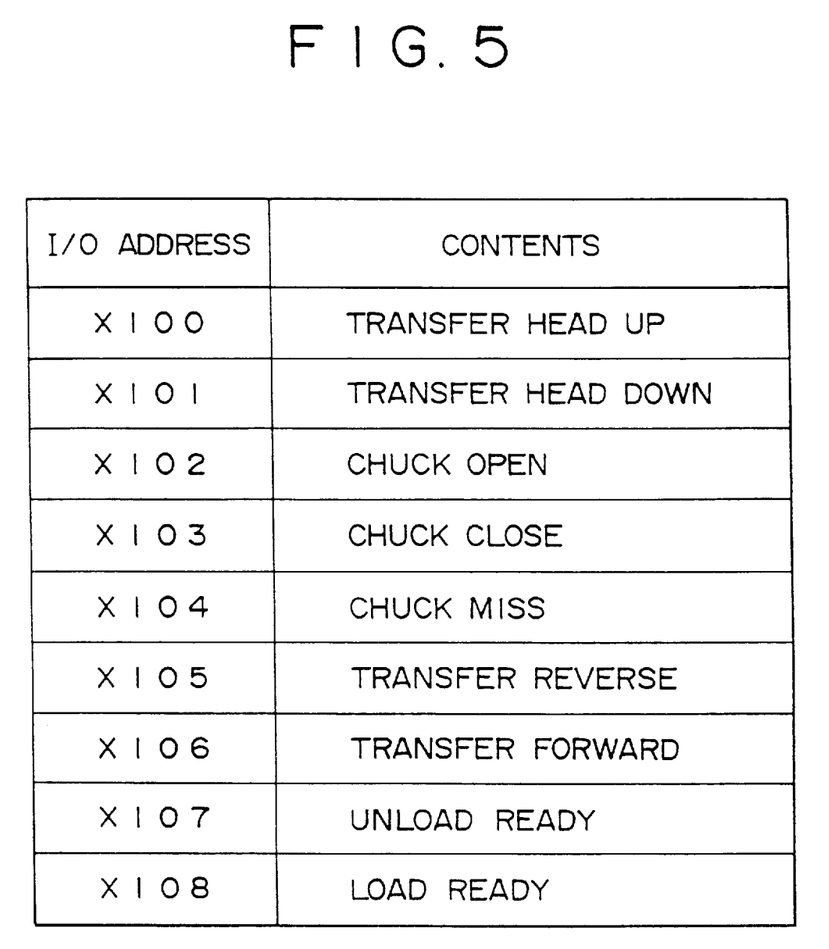
FIG. 5 is a table showing an example of allocation of I/O ports.

Now a concrete example of the sequence executed in the processing equipment 1 will be described. FIGS. 3 and 4 explain an exemplary sequence which comprises steps 1 to 8 (FIG. 3) of first grasping a desired article, which is to be processed, by a chuck of a transfer machine (shift means), then carrying the article up to another position, and thereafter returning the same to the former position of the chuck. The input data to the I/O port in this operation are shown in FIG. 5.

The control operation of the PLC 2 relative to this sequence will be described below.

Step 1: For grasping a desired article placed at a predetermined position, a command is sent to lower a transfer head. A relay switch is actuated in response to this command to thereby drive the transfer head. Then a detection is made from a sensor output as to whether the transfer head has been properly lowered or not down to a predetermined position. The operation proceeds to step 2 after such detection.

Step 2: A command is sent to grasp the article by a chuck. The relay switch is actuated in response to this command to thereby drive the chuck. Then a detection is made by the sensor that the article has been grasped. The operation proceeds to step 3 after such detection.

Step 3: A command is sent to raise the transfer head for transferring the article. The relay switch is actuated in response to this command to thereby drive the transfer head. And a detection is made from-the sensor output as to whether the transfer head has been properly raised or not up to a predetermined position. The operation proceeds to step 4 after such detection.

Step 4: A command is sent to shift the transfer in the forward direction for shifting the article to a predetermined position. The relay switch is actuated in response to this command to thereby drive the transfer in the forward direction. Then a detection is made from the sensor output as to whether the transfer has been properly shifted or not to the predetermined position. The operation proceeds to step 5 after such detection.

Step 5: A command is sent to lower the transfer head for setting the article at a predetermined position. The relay switch is actuated in response to this command to thereby drive the transfer head. Then a detection is made from the sensor output as to whether the transfer head has been properly lowered or not down to the predetermined position. The operation proceeds to step 6 after such detection.

Step 6: A command is sent to open the chuck for receiving the article. The relay switch is actuated in response to this command to thereby drive the chuck. Then a detection is made by the sensor as to whether the article has been received. The operation proceeds to step 7 after such detection.

Step 7: A command is sent to raise the transfer head. The relay switch is actuated in response to this command to thereby drive the transfer head. Then a detection is made from the sensor output as to whether the transfer head has been properly raised or not up to the predetermined position. The operation proceeds to step 8 after such detection.

Step 8: A command is sent to shift the transfer in the reverse direction for shifting a next desired article by lowering the transfer head down to a predetermined position. The relay switch is actuated in response to this command to thereby drive the transfer in the reverse direction. Then a detection is made from the sensor output as to whether the transfer has been properly shifted or not to the predetermined position. One sequence of the operation is completed upon such detection and, after resetting, execution of a next sequence starts with step 1 again.

The PLC 2 receives, in addition to the sensor output of the I/O data, the on/off information Se of each relay controlled in accordance with the output of each sensor, and checks if the relay has practically been driven under control. The sensors and the relays are numbered individually for identification.

In this example, when the state of any one of the relays has been changed due to some action performed in the processing equipment, the PLC 2 regards the instant of such change as occurrence of an event and records data with regard to the event. Thus, the PLC 2 recognizes which of the steps is currently being executed. The operation of recording the state change is performed per sequence as a unit and is reset upon completion of each sequence.

During the operation of the processing equipment, the state of each relay monitored by the PLC 2 is changed with every change of the steps for example. The program incorporated in the PLC 2 stores such change in an internal memory. The timing of storage in the internal memory corresponds to a change of any one of the relays being monitored. Then the PLC 2 alters the relevant address in the memory and holds the stored change until the end of one cycle (loop end). And upon completion of each cycle, the memory is reset.

In this exemplary case, the following three kinds of information are stored.

The first is data change time information CNT whose value is incremented in response to a change of any one of the relays corresponding to a plurality of channels monitored by the PLC 2. This data change time information CNT is obtained in accordance with some operation performed in the processing equipment 1 and serves as an index for storage of the other two kinds of information while regarding the change as an event. This information is reset to "0" at a loop end and serves as an identifier for each of plural data change time points during each sequence. A counter is used for storing such data change time information CNT.

The second information to be stored is the data obtained from the processing equipment (hereinafter referred to as output data OUT). This output data is composed of 1 bit (1 digit) which represents the relevant output channel corresponding to each relay and so forth individually. In this example, the output data comprises information of one or more channels related to the operation of the processing equipment 1. Since display lamps and various display devices belonging to the processing equipment 1 are not concerned with the sequence operation of the processing equipment, bits for switching them on or off are not necessary for diagnosis of abnormality. Therefore, these bits are removed from the output data OUT, and merely the necessary bits alone are included.

The third data to be stored is channel change frequency information CM. The value of this information signifies the frequency or the number of times of changes of each output channel and is incremented successively in accordance with the output data OUT mentioned above. This information CM is used for adding a weight of changes to each output channel bit (for indicating the frequency of changes of the relevant output channel bit).

During the operation of the processing equipment 1 performed under control of the PLC 2, the above-described three kinds of information are always stored individually in the memory by the PLC 2. Hereinafter an exemplary flow of the storage process executed by the PLC 2 will be explained with reference to a flow chart of FIG. 6.

Figure 6:
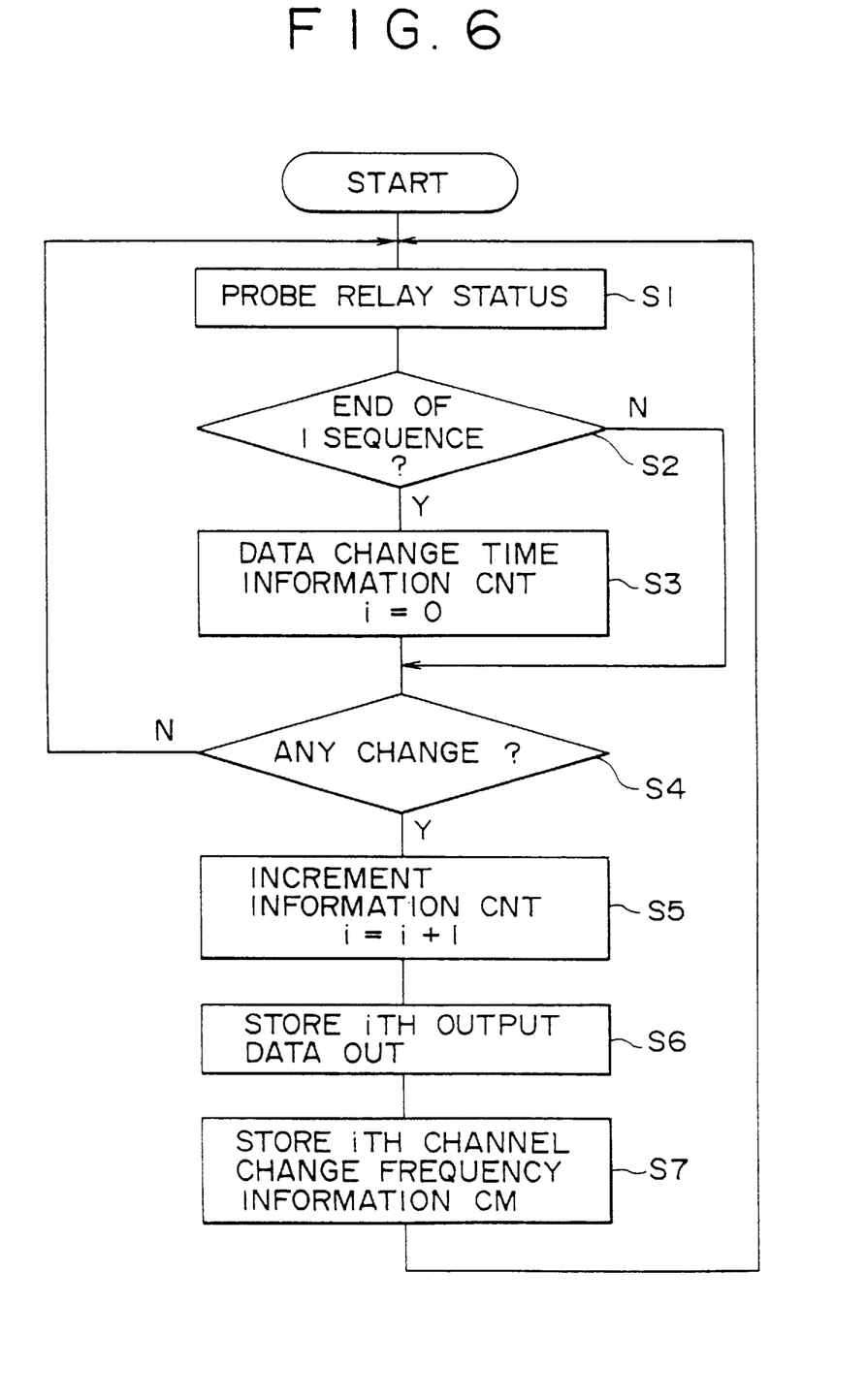
FIG. 6 is a flow chart showing a process for storage of information per operation change point in a PLC in the embodiment of the abnormality diagnosis apparatus of the present invention for the processing equipment.

First at step S1, each relay status in the processing equipment 1 is probed. Subsequently, a decision is made at step S2 as to whether the relay status indicates the end of one sequence (loop end) or not. If the result of such decision signifies the end of one sequence, the process proceeds from step S2 to step S3, where the value i of the change time information CNT is set to "0", and the process proceeds to step S4. Meanwhile, if the result of the decision does not signify the end of one sequence, the process proceeds directly from step S2 to step S4.

At step S4, a decision is made as to whether any relay status has been changed or not. If the result of such decision signifies no change, the process returns to step S1 and waits until occurrence of a change. In case any one relay status has been changed, the process proceeds from step S4 to step S5, where the value i of the data change time information CNT is incremented by "1". Then the process proceeds to step S6 to store the output data OUT of plural channels corresponding to the relay statuses and so forth at the incremented value of the data change time information CNT. Thereafter the process proceeds to step S7 to increment the value of the channel change frequency information CM relative to the changed bit in the output data. Subsequently the process returns to step S1, and repeats the foregoing storage in the memory.

Figure 7:
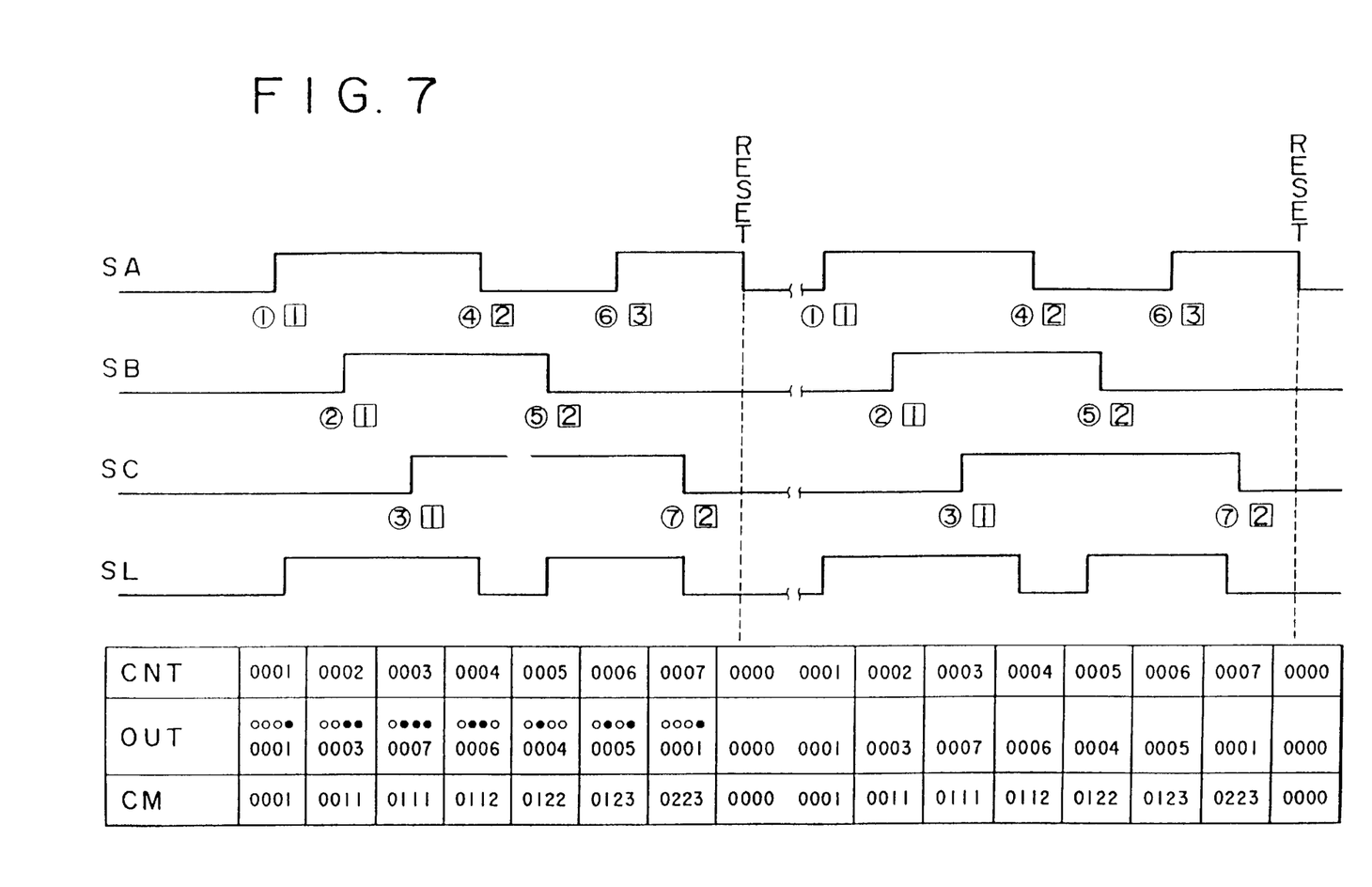
FIG. 7 shows an example of information changes per operation change point in the PLC in the embodiment of the abnormality diagnosis apparatus of the invention for the processing equipment.

FIG. 7 is a diagram for explaining exemplary information obtained from the processing equipment 1 to be stored. The example of FIG. 7 shows changes of three actuator on/off outputs SA, SB, SC and one lamp driving output SL in one sequence. This example represents a case where a loop end of one sequence is indicated when all the outputs SA, SB, SC and SL are off (at a low level).

In this case, the lamp driving output is not concerned directly with the operation of the equipment 1, so that the lamp driving output is not an object of the information in the output data OUT, and therefore the output channels are three which deliver on/off outputs SA, SB and SC of three actuators A, B and C. In FIG. 7, each numeral enclosed in a circle ○ denotes the value of the data change time information CNT, and each numeral enclosed in a square □ denotes the frequency of changes in the relevant channel.

Consequently the data change time information CNT, the output data OUT and the channel change frequency information CM in this exemplary sequence are such as those shown in the lower table of FIG. 7. More specifically, the example of FIG. 7 shows that there are seven change time points during one sequence, wherein the channels with such changes are represented by the output data OUT, and the digit of the channel change frequency information CM relative to each channel signifies, at the change time point thereof, the ordinal number of the change caused in the relevant channel during one sequence.

In the column of the output data OUT, a symbol ○ of each digit denotes "off", and a symbol ● thereof denotes "on".

During the sequence described above, when any abnormal state has occurred in such a manner that the transfer machine for example is brought to a halt due to some trouble or the like, the operation of the processing equipment 1 is interrupted, and simultaneously the PLC 2 stops the program in that state. Although the stop point of the program can be detected from the sensor output, such detection program is not incorporated in the PLC2. If the trouble is one of those presupposed in the processing equipment, the arrangement may be so contrived as to switch on an alarm buzzer or an alarm lamp as a portion of the sequence of the PLC 2. However, in case the trouble is an unpredictable one, no alarm is generated and the whole system is kept at a halt.

For the purpose of automatically diagnosing such abnormal state and giving an adequate instruction to the user to take a proper action, a computer 3 is connected to the PLC 2 in this embodiment.

In the case of this embodiment, the computer 3 is equipped with, as shown in FIG. 1, some function means including an automatic memory means 31 for storing a normal sequence state, an automatic abnormal output detector means 32, an abnormality analytic diagnosis and instructional information generator means 33, and a hard disk device 34 as a memory means for storing the aforementioned data change time information CNT, output data OUT and channel change frequency information CM of one sequence.

The data change time information CNT, the output data OUT and the channel change frequency information CM of one sequence stored in the internal memory of the PLC 2 are stored previously in the automatic memory means 31 during a normal operation of the processing equipment 1 under control of the PLC 2.

Figure 8:
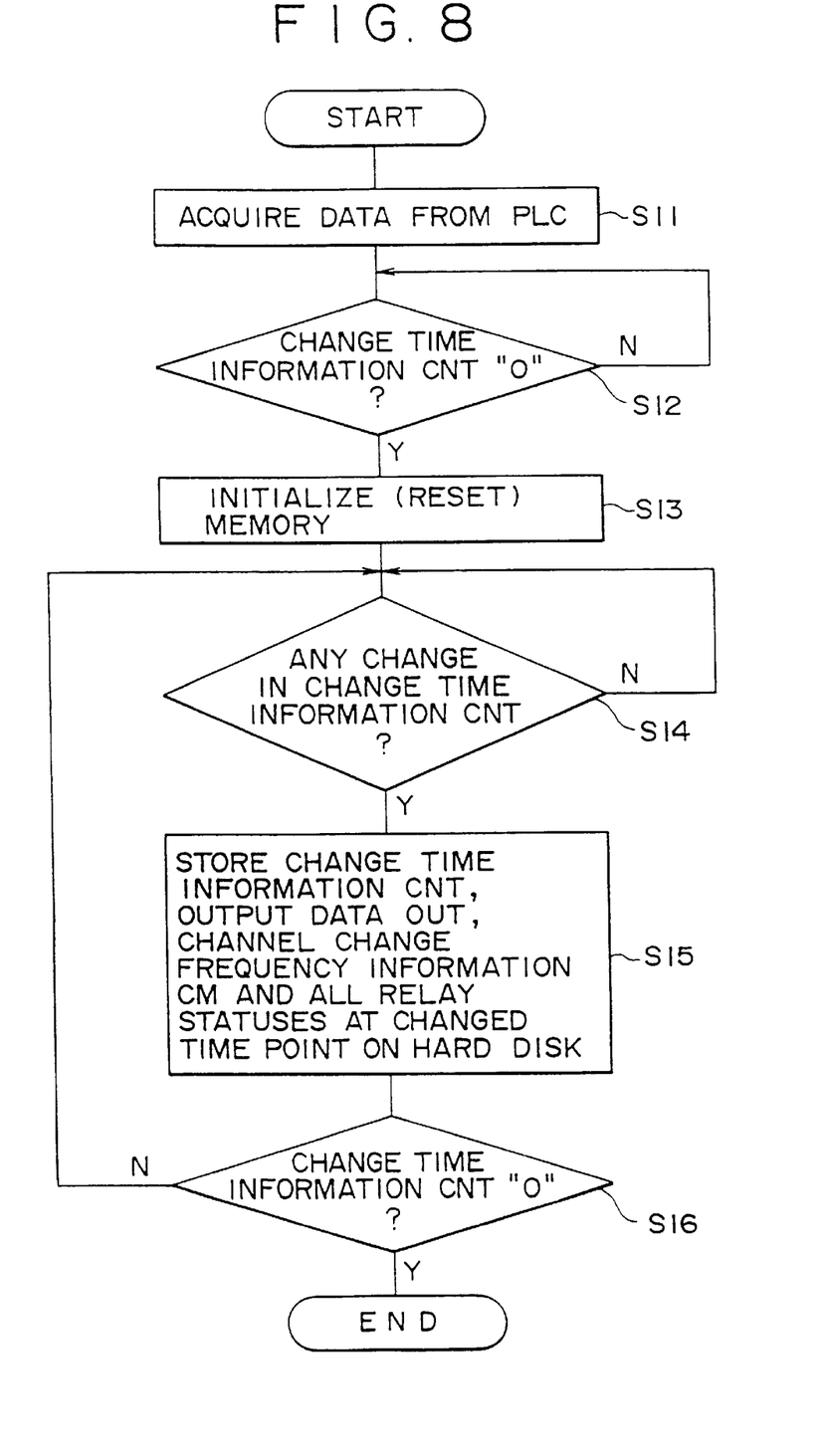
FIG. 8 is a flow chart showing an automatic storage process in a computer employed in the embodiment of the abnormality diagnosis apparatus of the invention for the processing equipment.

A flow of the storage process in this automatic memory means 31 will now be explained below with reference to a flow chart of FIG. 8.

First at step S11, the computer 3 sends a request to the PLC 2 for acquisition of the aforementioned information. Then at step S12, a decision is made as to whether the value of the change time information CNT included in the acquired information is "0" which denotes a loop end of one sequence. If the result of such decision is negative, the process is kept waiting until the loop end. And upon detection of the loop end, the process proceeds from step S12 to step S13, where the storage region for the three kinds of information is reset (cleared).

Thereafter a decision is made at step S14 as to whether the value of the data change time information CNT from the PLC 2 has been changed or not. If the result of such decision signifies a change, the process proceeds to step S15, where the change time information CNT, the output data OUT, the channel change frequency information CM and the status information of the entire relays are acquired from the PLC 2, and then a file name corresponding to the value of the data change time information CNT is given and stored on the hard disk 34. For example, when the value of the data change time information CNT is "0000", the change time information CNT, the output data OUT and the channel change information CM at that time point are stored as a file having a file name of, e.g., "DATAFILE.000".

And in response to every change of the value of the change time information CNT, the execution of steps S14 and S15 is repeated (at step S16) until the loop end of one sequence represented by a value "0" of the change time information CNT. This routine is completed when a file name for identifying the output data OUT, the channel change frequency and the relay statuses relative to the entire change time points in one sequence has been given and stored.

The automatic abnormal output detector means 32 is actuated in response to manipulation of, e.g., a key control console of the computer 3 by the user when the processing equipment 1 has been brought to a halt due to occurrence of some abnormality, whereby the program is started. Then the means 32 detects the relevant output channel of the output data OUT where the abnormal state has occurred.

The abnormality analytic diagnosis and instructional information generator means 33 first diagnoses the abnormality on the basis of the detection result obtained from the automatic abnormal output detector means 32, the statuses of the entire relays in the PLC 2 at the occurrence of the abnormality, and the statuses of the relays at that time point stored in the hard disk device 34, and then generates adequate instructional information for the user and displays such information on the display device 4 or outputs an audio message.

Figure 9:
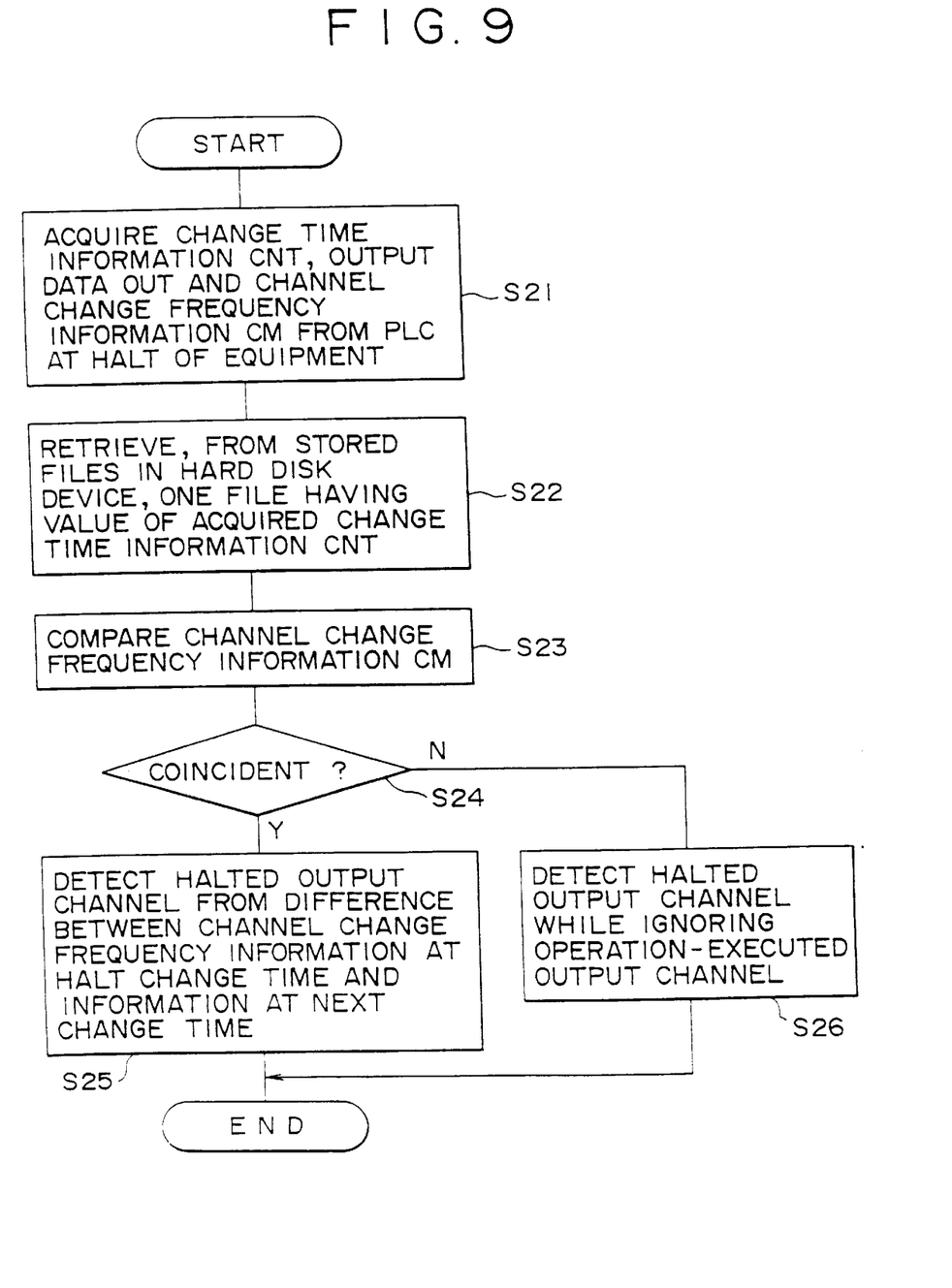
FIG. 9 is a flow chart showing a process of automatic abnormality output detection means in the computer employed in the embodiment of the abnormality diagnosis apparatus of the invention for the processing equipment.

Next an exemplary flow of the processing operation in the automatic abnormal output detector means 32 will be explained below with reference to a flow chart of FIG. 9.

First at step S21, the computer 3 acquires from the PLC 2 the data change time information CNT, the output data OUT and the channel change frequency information CM at a halt of the equipment 1. Subsequently at step S22, the desired file with the file name corresponding to the value of the data change time information CNT acquired at step S21 is retrieved from the stored files in the hard disk device 34.

Thereafter the process proceeds to step S23, where the channel change frequency information CM included in the data of that file name is compared with the channel change frequency information CM acquired at step 21 in response to a halt of the equipment 1 (upon occurrence of a trouble). And at the next step S24, a decision is made as to whether a coincidence is obtained between the compared information.

If the result of the decision at step S24 signifies a coincidence between the digits of the compared channel change frequency information CM, the process proceeds to step S25 where the following analysis is performed. That is, when a coincidence is obtained between the digits of the compared channel change frequency information, it is so judged that the processing equipment 1 kept in its normal operating state has failed to advance to the next operation to be thereby brought to a halt. More specifically, it is considered that the channel change frequency information CM has failed to be changed from the value at the halt time point to the value of the channel change frequency information CM at the next data change time point.

Therefore, on the basis of the difference taken between each digit of the channel change frequency information CM at the halt time point and each digit of the channel change frequency information CM at the next data change time point, it is found that the channel with the changed digit is the relevant channel which has failed to be changed contrary to its essential change and that the abnormal state has occurred in this channel.

Suppose now that, in the sequence of FIG. 7 for example, the three kinds of information at a halt of the equipment 1 are as follows:

data change time CNT=0004 output data OUT=0006 channel change frequency CM=0112

In this case, the value of the channel change frequency information CM at the data change time CNT is coincident with the value stored in the hard disk device 34, and there is calculated the difference between this value and the channel change frequency information CM=0122 at the next data change time CNT=0005. Since the difference therebetween is Δ=0010, it is found that some abnormality has occurred in the second channel, i.e., in a portion relative to the actuator B in FIG. 7.

Meanwhile, if the result of the decision at step S24 signifies non-coincidence between the compared digits of the two channel change frequencies, the process proceeds to step S26 where the following analysis is performed.

As described, the processing equipment 1 in this example is divided into a plurality of small modules since the scale thereof is great, and the individual small modules operate independently of one another and monitor the states mutually at predetermined points to thereby achieve the intended object of the whole equipment. Consequently, a time lag (delay) is generated until any trouble caused in one portion actually affects the whole equipment. Non-coincidence between the compared channel change frequency information CM is so considered that, when the operation of one module is brought to a halt, the other modules still perform the operations thereof and then become unable to continue the operations finally due to the interrupted operation of the module at a halt.

In view of the above, the two-channel change frequency information CM at the halted data change time are compared with the channel change frequency information CM at the preceding change time earlier than the halted change time, and the changed channel, where the operation was executed, is ignored while the digit of the unchanged channel, which needed to be changed essentially but was not changed actually, is detected as an abnormality.

Suppose now that, in the sequence of FIG. 7 for example, the three kinds of information at a halt of the equipment 1 are as follows:

data change time CNT=0004 output data OUT=0005 channel change frequency CM=0121

In this case, the channel change frequency information CM is 0112 at the data change time CNT which is the same as the equipment halt time stored in the hard disk device 34, so that the two values are not coincident with each other. And it is found that, since the channel change frequency information CM is 0111 at the change time CNT=0003 immediately preceding the halt time, the fourth digit relative to the actuator C in FIG. 7 needed to be changed from "1" to "2", but the actuator C had already been halted at the preceding change time CNT=0003 and therefore the equipment was brought to a halt.

In the manner described hereinabove, the automatic abnormal output detector means 32 is capable of detecting the relevant output channel with the abnormality caused therein.

The information of the abnormal output channel thus detected by the automatic abnormal output detector means 32 is supplied to the abnormality analytic diagnosis and instructional information generator means 33. In this means 33, the statuses of the entire relays concerned with the relevant output channel and stored in the hard disk device 34 are read out therefrom, and the status information of the entire relays are acquired from the PLC 2, whereby the cause of the trouble is found out and then is supplied to the display device 4 to notify the user.

Figure 10:
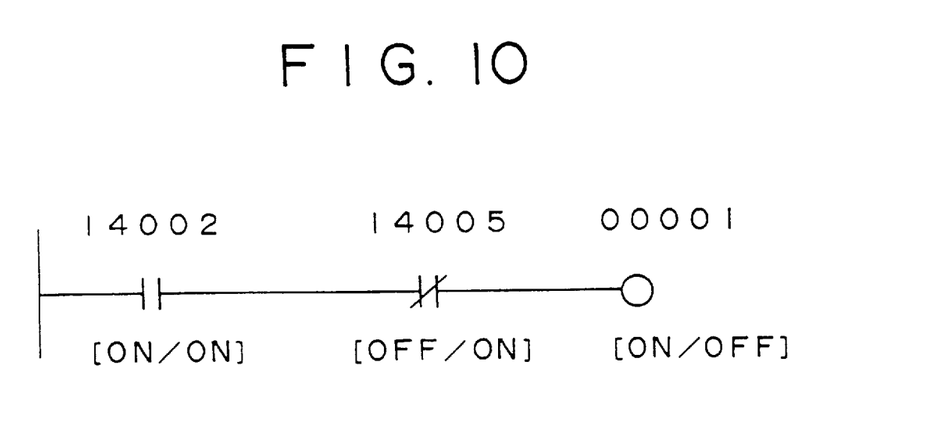
FIG. 10 is a diagram showing an exemplary program incorporated in the PLC.

Assume here that the ladder program in the PLC 2 is such as shown in FIG. 10 for example and the state of the detected channel output "00001" is an AND of the control relay "14002" (normally-open relay) and the control relay "14005" (normally-closed relay). In this diagram, "/"

denotes "actual state/stored normal state". As obvious from the above, the state in this example signifies that, since the control relay "14005" is actually "off" instead of being correct "on", the output "00001" is turned to "on".

Figure 11:
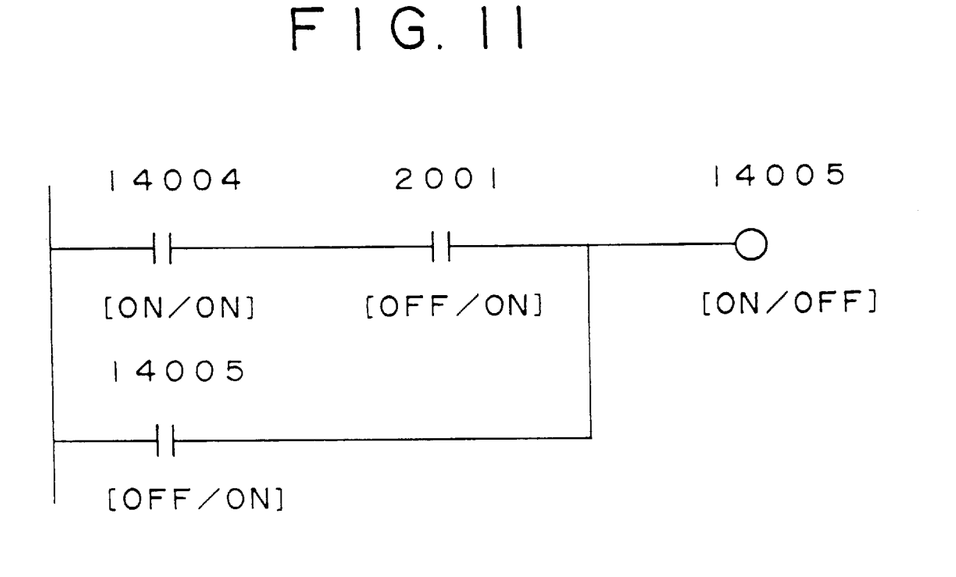
FIG. 11 is a diagram showing another exemplary program incorporated in the PLC.

The above can be detected by probing the statuses of the control relays by the means 33. If the control relay "14005" is driven by an AND of the control relay "14004" and the sensor "2001" as shown in FIG. 11, occurrence of any abnormality can be ascertained by probing the status of the sensor "2001" as this sensor "2001" is kept "off" instead of being switched on.

Thus, it becomes possible to analyze any abnormality by comparing the statuses of the relays and the sensors at a halt with those in the normal operation, hence notifying the user of the abnormality.

As described hereinabove, according to the present invention where the computer connected to the PLC executes a diagnosis of any abnormality by itself and gives an adequate instruction to a user, so that any ordinary nonprofessional user is enabled to perform proper trouble-shooting that has been heretofore achieved merely by experts having sufficient knowledge. Consequently, the halt time derived from occurrence of any abnormality can be curtailed to eventually enhance the operation efficiency of the processing equipment, whereby an increase of the production can be expected.

Furthermore, the computer is capable of analyzing the abnormality regardless of the control program in the PLC, so that it is rendered possible to ensure remarkable enhancement in the abnormality diagnosis apparatus and method with high general-purpose usability.

What is claimed is:

1. An abnormality diagnosis apparatus wherein a computer is connected to a programmable logic controller for controlling the operation of a processing equipment which repeats a predetermined sequence of a plurality of steps, while monitoring information obtained from said processing equipment and changed in accordance with the operation in said processing equipment, thereby automatically detecting any abnormal state induced in said processing equipment;

wherein said computer comprises memory means for previously storing changes of the information of at least one sequence from said processing equipment in a normal operation thereof; and automatic analysis means for acquiring the information from said processing equipment during its halt caused upon occurrence of any abnormality in said equipment, then performing a logical operation between the acquired information and the information stored previously in said memory means, and executing an analysis of the abnormal state to determine a portion of said processing equipment responsible for the abnormal state on the basis of the result of such logical operation.

2. The abnormality diagnosis apparatus according to claim 1, wherein the information from said processing equipment includes at least an identifier of the information change time, and information of one or more channels relative to the operation of said processing equipment; and said automatic analysis means detects, from said identifier, the information change time at the halt of said processing equipment, then compares the stored information of each channel at the detected change time with the information of each channel acquired from said controller, and selectively detects, on the basis of the result of such comparison, the relevant one channel concerned with occurrence of the abnormal state.

3. An abnormality diagnosis apparatus according to claim 1, wherein the acquired information and the information stored previously are represented by binary numbers.

4. The abnormality diagnosis apparatus according to claim 3, wherein said logical operation comprises an exclusive or (XOR) operation.

5. The abnormality diagnosis apparatus according to claim 3, wherein the result of the logical operation indicates a non-functioning apparatus.

6. The abnormality diagnosis apparatus according to claim 1, wherein said acquired information and information previously stored are indicative of a particular step in a sequence of events, which is further indicative of the state of each of a plurality of portions of said processing equipment.

7. An abnormality diagnosis method characterized by: connecting a computer to a programmable logic controller for controlling the operation of a processing equipment which repeats a predetermined sequence of a plurality of steps;

previously storing, in memory means of said computer, changes of information of at least one sequence obtained from said processing equipment in a normal operation thereof; and acquiring, by said computer, the information from said processing equipment during its halt caused upon occurrence of an abnormal state in said equipment then performing a logical operation between the acquired information and the information stored previously in said memory means, and executing an analysis of the abnormal state to determine a portion of said processing equipment responsible for the abnormal state on the basis of the result of such logical operation.

8. An abnormality diagnosis method according to claim 7, wherein the acquired information and the information stored previously are represented by binary numbers.

9. The abnormality diagnosis method according to claim 8, wherein said logical operation comprises an exclusive or (XOR) operation.

10. The abnormality diagnosis method according to claim 8, wherein the result of the logical operation indicates a non-functioning apparatus.

11. The abnormality diagnosis apparatus according to claim 7, wherein said acquired information and information previously stored are indicative of a particular step in a sequence of events, which is further indicative of the state of each of a plurality of portions of said processing equipment.

12. An abnormality diagnosis apparatus wherein a computer is connected to a programmable logic controller for controlling the operation of a processing equipment which repeats a predetermined sequence of a plurality of steps, while monitoring information obtained from said processing equipment and changed in accordance with the operation in said processing equipment, thereby automatically detecting any abnormal state induced in said processing equipment;

wherein said computer comprises memory means for previously storing changes of the information of at least one sequence from said processing equipment in a normal operation thereof; and automatic analysis means for acquiring the information from said processing equipment during its halt caused upon occurrence of any abnormality in said equipment, then comparing the acquired information with the information stored previously in said memory means, and executing an analysis of the abnormal state on the basis of the result of such comparison; and wherein the information acquired from said processing equipment to be stored includes at least an identifier of the information change time, and information of one or more channels relative to the operation of said processing equipment and indicating the frequency of changes of each of said channels; and said automatic analysis means detects, from said identifier, the information change time at the halt of said processing equipment, then compares the stored change frequency information of each channel at the detected change time with the change frequency information of each channel acquired from said controller, and selectively detects, on the basis of the result of such comparison, the relevant one channel concerned with occurrence of the abnormal state.

* * * * *